«12» United States Patent
Picht et al.

(10) Patent No.: US 9,835,266 B2
(45) Date of Patent: Dec. 5, 2017

(54) PRESSURE REGULATOR

(71) Applicant: Eisenmann SE, Boeblingen (DE)

(72) Inventors: Hans-Peter Picht, Paderborn (DE); Ruediger Schweikardt, Bielefeld (DE)

(73) Assignee: EISENMANN SE, Boeblingen (DE)

( * ) Notice: Subject to any disclaimer, the term of this patent is extended or adjusted under 35 U.S.C. 154(b) by 15 days.

(21) Appl. No.: 14/765,883

(22) PCT Filed: Jan. 16, 2014

(86) PCT No.: PCT/EP2014/000105
§ 371 (c)(1),
(2) Date: Aug. 5, 2015

(87) PCT Pub. No.: WO2014/121887
PCT Pub. Date: Aug. 14, 2014

(65) Prior Publication Data
US 2015/0369393 A1 Dec. 24, 2015

(30) Foreign Application Priority Data

Feb. 5, 2013 (DE) .......... 10 2013 001 979

(51) Int. Cl.
| F16K 7/12 | (2006.01) |
| F16K 37/00 | (2006.01) |
| G05D 16/00 | (2006.01) |
| G05D 16/06 | (2006.01) |
| G05D 16/18 | (2006.01) |

(52) U.S. Cl.
CPC .......... *F16K 37/0083* (2013.01); *F16K 7/126* (2013.01); *G05D 16/063* (2013.01); *G05D 16/0652* (2013.01); *G05D 16/185* (2013.01)

(58) Field of Classification Search
CPC .... G05D 16/00; G05D 16/06; G05D 16/0652; G05D 16/063; G05D 16/185; F16K 7/12; F16K 7/126; F16K 7/17; F16K 7/00; F16K 37/0083; F16K 37/00
See application file for complete search history.

(56) References Cited

U.S. PATENT DOCUMENTS

| 5,549,137 A | 8/1996 | Lenz et al. |
| 5,558,115 A | 9/1996 | Lenz et al. |
| 5,573,032 A | 11/1996 | Lenz et al. |
| 5,616,829 A * | 4/1997 | Balaschak ............ F16K 31/046 |
| | | 137/551 |
| 6,089,531 A | 7/2000 | Young |
| 7,069,948 B2 * | 7/2006 | Lovell ................. F16K 37/0016 |
| | | 116/277 |

(Continued)

FOREIGN PATENT DOCUMENTS

| DE | 43 35 186 A1 | 4/1995 |
| DE | 14 19 168 A1 | 12/1995 |

(Continued)

*Primary Examiner* — Nguyen Ha

(57) ABSTRACT

A pressure regulator for liquid media includes a through-flow path which extends between two connections for a medium-conducting line. The through-flow path is equipped with a valve seat which can be released or closed by a closing element that is mounted in a movable manner between a closing position and a release position. A wear of the closing element and/or the valve seat can be monitored during ongoing operations using a wear sensor device.

20 Claims, 4 Drawing Sheets

(56) References Cited

U.S. PATENT DOCUMENTS

| | | | |
|---|---|---|---|
| 2003/0233203 A1 | 12/2003 | Grumstrup et al. | |
| 2008/0163937 A1* | 7/2008 | Esposito | F16K 37/0091 137/487.5 |
| 2008/0202606 A1* | 8/2008 | O'Hara | F16K 37/0083 137/551 |
| 2008/0257428 A1* | 10/2008 | Scholz | F16K 31/126 137/554 |
| 2010/0179697 A1* | 7/2010 | Stelter | F16K 31/126 700/282 |
| 2010/0192677 A1* | 8/2010 | Puttmer | F16K 37/0083 73/40.5 A |
| 2011/0180165 A1* | 7/2011 | Hansson | F16K 1/36 137/554 |

FOREIGN PATENT DOCUMENTS

| | | | |
|---|---|---|---|
| DE | 694 32 029 T2 | 11/2003 | |
| DE | 10 2009 051 103 A1 | 1/2004 | |
| DE | 102 28 276 A1 | 1/2004 | |
| EP | 0 648 965 A1 | 10/1994 | |
| EP | 0 822 343 A2 | 7/1997 | |
| EP | 1 376 289 A1 | 6/2003 | |
| WO | WO 2010046409 A1 * | 4/2010 | G05D 16/0663 |

* cited by examiner

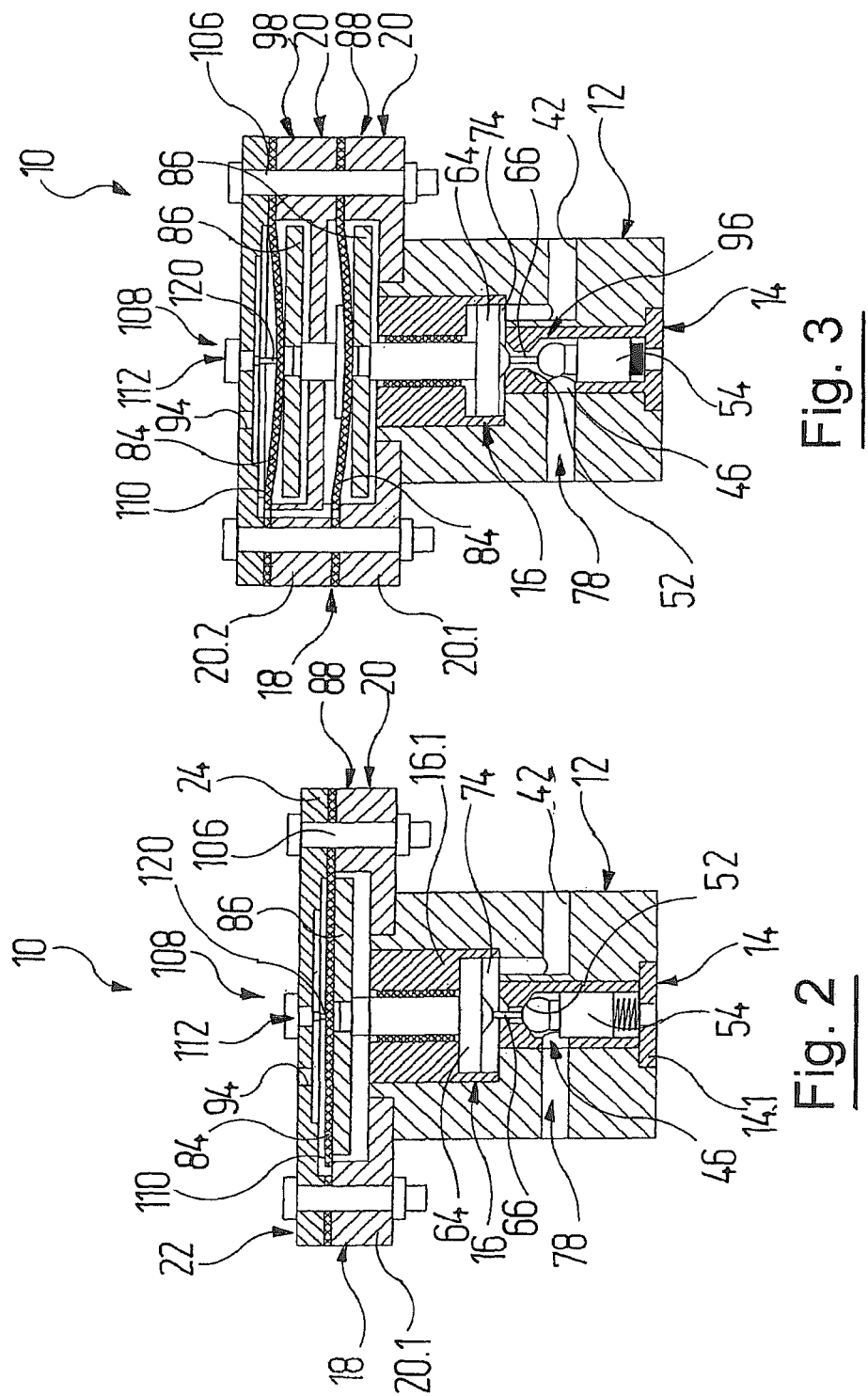

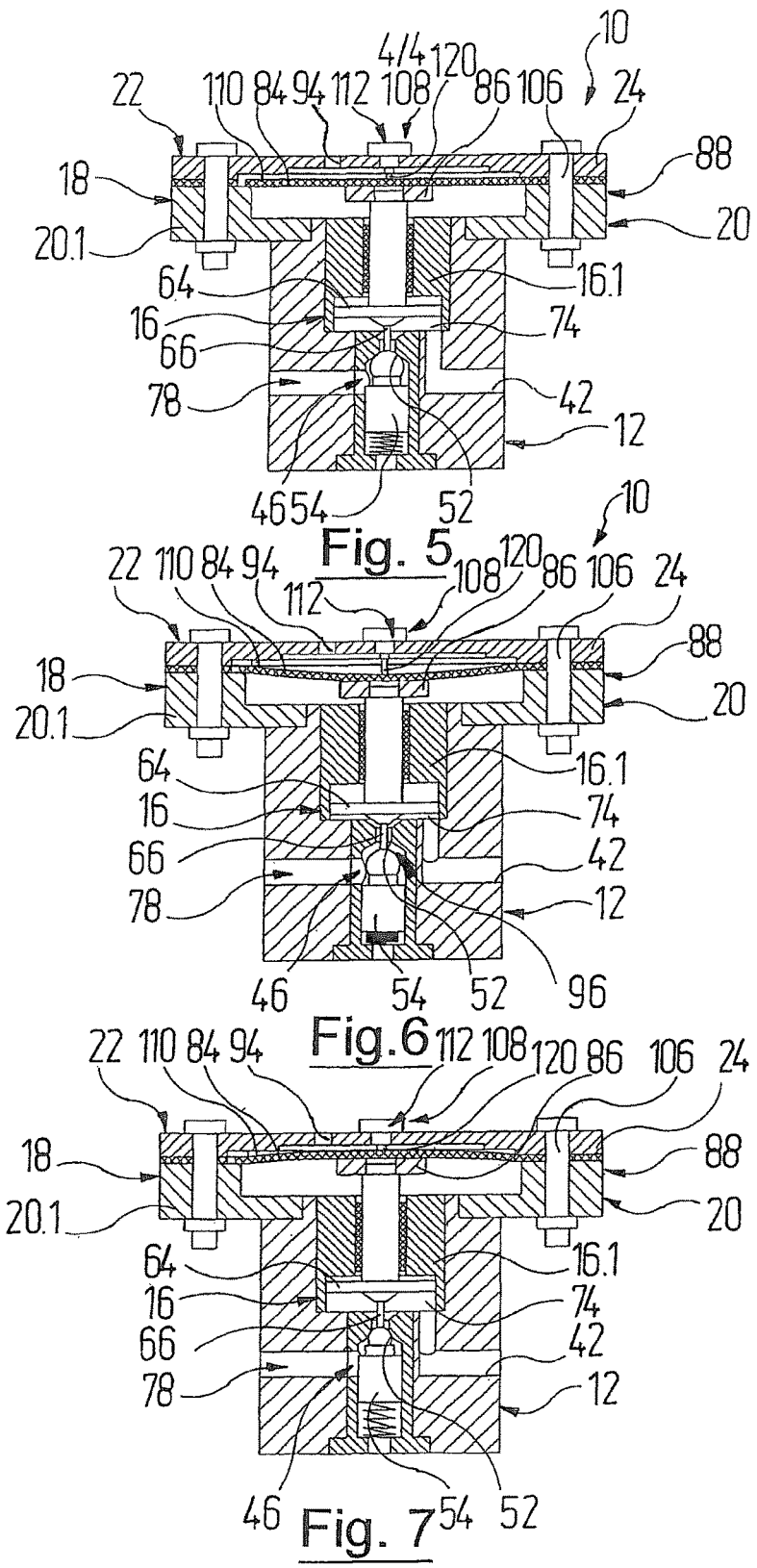

PRESSURE REGULATOR

RELATED APPLICATIONS

This application is a national phase of International Patent Application No. PCT/EP2014/000105, filed Jan. 16, 2014, which claims the filing benefit of German Patent Application No. 10 2013 001 979.6, filed Feb. 5, 2013, the contents of both of which are incorporated herein by reference.

FIELD OF THE INVENTION

The invention relates to a pressure regulator for fluid media having
a) a through-flow path which extends between two connections for a media-conducting line;
b) a valve seat which is arranged in the through-flow path and can be released or closed by a closing element which is mounted movably between a closed position and a released position.

BACKGROUND OF THE INVENTION

Pressure regulators of this kind are known, for example, from DE 44 19 168 A1 and are used to regulate the pressure in a medium-conducting line, by which an application device is fed. For example, such pressure regulators are employed in paint lines of a painting installation. Other fields of application are the material supply for applying an underbody coating or for seam sealing in vehicle bodies. The latter applications come under the term of a so-called thick-matter supply, since the media applied there are generally very viscous.

The formation and shape of the application jet depends inter alia substantially on the viscosity of the medium to be applied and it is the aim to ensure a uniform volume flow to the application device with the aid of the pressure regulator.

For this purpose, a pressure sensor and/or a volume flow sensor are in most cases present in the medium-conducting line. The pressure regulator is then activated in dependence on the output signals of the sensor(s). When the through-flow path of the pressure regulator is open, there is formed between the closing element and the valve seat an annular gap, the passage cross-section of which depends on the position of the closing element relative to the valve seat. Via this and via optionally present flow spaces with variable volume, the through-flow of the application medium can be regulated.

In the course of operation, there arise wear phenomena, especially on the closing element and on the valve seat, in a form that results in a wear of the closing element and of the valve seat to a greater or lesser degree. This wear occurs especially when the conveyed application medium is viscous, abrasive or aggressive or has more than one of these properties.

The wear may result in the cooperating components of closing element and valve seat no longer being perfectly matched to one another. As a result, the operational reliability of the pressure regulator is no longer guaranteed. Hitherto, such wear has come to light only through a fault which has already occurred and which leads to a shutdown of operation during operation, since the pressure regulator affected has to be exchanged immediately after the occurrence of the fault during the operating time.

SUMMARY OF THE INVENTION

It is therefore an object of the invention to provide a pressure regulator of the kind mentioned at the outset, in which these disadvantages are at least largely eliminated.

This object may be achieved in the case of a pressure regulator of the kind mentioned at the outset by
c) a wear sensor device, with which a wear of the closing element and/or of the valve seat can be monitored during operation.

The invention is based on the insight that it is possible to sense and monitor the state of the closing element and/or of the valve seat directly at the pressure regulator. As a result, wear phenomena can be detected early, so that a required exchange of the pressure regulator or of individual components of the same can be carried out at a time at when this does not cause any disruption to production. The appearance of wear phenomena generally does not lead to an immediate failure of the pressure regulator. The required work can therefore be carried out later when the affected installation is shut down anyway, for example during a standard stoppage or on production-free weekends or the like.

With regard to the monitoring, it is favourable when the wear sensor device is configured in such a manner that the position of the closing element relative to a reference zero position can be sensed. This means, for example, that the wear sensor device is calibrated during the installation of an unimpaired pressure regulator.

In this regard, the reference zero position is defined when the unimpaired closing element occupies its closed position and lies against and closes an unimpaired valve seat. A wear of the components also manifests itself always in a different closed position of the closing element against the valve seat.

It is possible for the wear sensor device to sense the position of the closing element directly at the closing element itself. In this case, however, during an exchange the wear sensor device may possibly also have to be exchanged. It is therefore advantageous when the position of the closing element can be indirectly sensed by the wear sensor device.

In this case, the closing element is preferably coupled to an actuator and the wear sensor device is configured in such a manner that this device determines the position of the closing element indirectly via the configuration and/or the position of this actuator.

It has proved particularly favourable when
a) the actuator is a pressure membrane which curves as a result of pressure, with an axial movement of the closing element being producible by the pressure membrane;
b) the wear sensor device comprises a distance sensor, by which the distance between a measuring point on the pressure membrane and a reference point can be sensed, so that the pressure membrane serves as a measuring membrane.

The curvature of such a pressure membrane also reflects always the movement or the position of the closing element moved thereby. It is thus possible to sense a deviation from an unimpaired operating state by a change of the curvature of the measuring membrane which the latter exhibits in the closed position of the closing element.

When the distance between the measuring point and the reference point is measurable in a direction parallel to the movement direction of the closing element, in particular coaxially thereto, the measured change in distance can advantageously correspond to the movement path of the closing element.

When the pressure regulator is equipped with a wear sensor device, it is particularly advantageous when the pressure regulator is of modular design and comprises a basic housing with at least one module space for functional modules.

In this case, as appropriate only the functional modules which exhibit wear phenomena can be exchanged. The wear sensor device itself can, however, remain on the pressure regulator.

In this case, it is favourable when the pressure regulator comprises at least one exchangeable valve seat module which is insertable into a module space of the basic housing and has a flow duct, in which the valve seat is arranged and which forms a section of the through-flow path when the valve seat module is inserted into the module space. If the valve seat is no longer perfect, the valve seat module thus worn can be exchanged for an unimpaired valve seat module, without the pressure regulator having to be separated from the connected medium-conducting line for this purpose.

It is accordingly advantageous when the at least one valve seat module comprises the closing element.

For the same reason, the pressure regulator preferably comprises at least one exchangeable regulating piston module which is insertable into a module space of the basic housing and has a regulating piston which regionally delimits a variable flow space which forms a section of the through-flow path when the regulating piston module is inserted into the module space.

Furthermore, it is favourable when the pressure regulator comprises a pressure unit which can be composed of a plurality of compressed-air modules which each comprise a compressed-air membrane which curves as a result of pressure, with an axial movement of the closing element being producible by the pressure membranes.

When the compressed-air unit comprises at least one compressed-air module and the pressure membrane of the latter is the measuring membrane, the wear sensor device can always remain on the pressure unit.

Preferably, the pressure regulator of modular design comprises in each case a set of valve seat modules, regulating piston modules and compressed-air modules which are each structurally different from a corresponding functional module of the same family. It is thus possible for the mode of operation of the pressure regulator to be adjusted by the exchange of the functional modules. This will be discussed further hereinbelow. For example, the diameters of the closing element or of the valve seat may vary in different valve seat modules.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

In the following, an exemplary embodiment of the invention will now be explained in more detail with reference to the drawings, in which:

FIG. 2 shows a section of an assembled pressure regulator in a closed configuration, the pressure unit of which comprises a single compressed-air module;

FIG. 3 shows a section, corresponding to FIG. 2, of an assembled pressure regulator in a through-flow configuration, the pressure unit of which comprises two compressed-air modules;

FIG. 5 shows a section of a pressure regulator with wear sensor device in its closed position;

FIG. 6 shows a section of the pressure regulator according to FIG. 5 in a through-flow configuration;

FIG. 7 shows a section of the pressure regulator according to FIGS. 5 and 6 in its closed position, a wear of a valve seat and of a closing element being illustrated.

DETAILED DESCRIPTION OF THE PRESENT INVENTION

Figure 1:
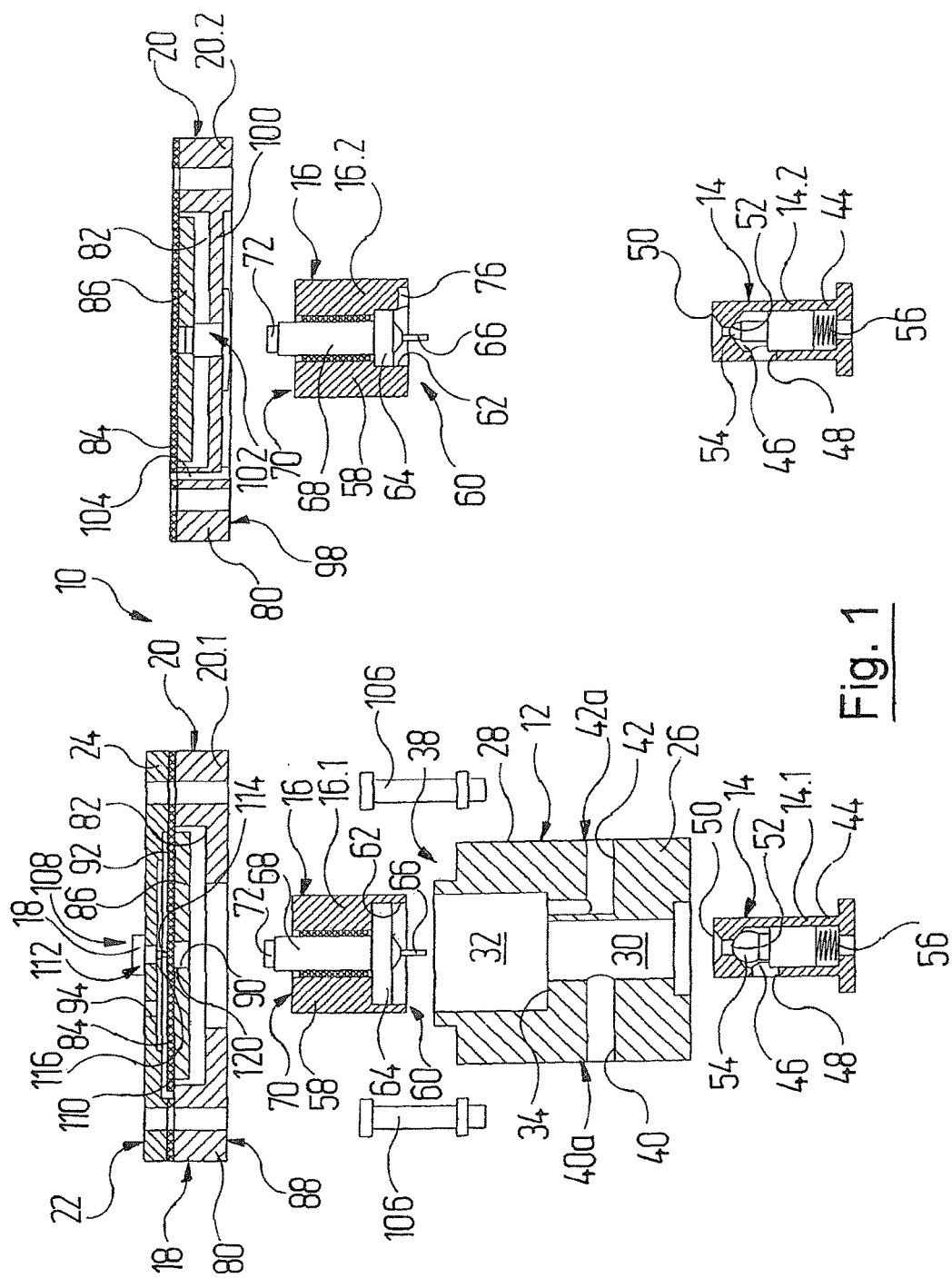
FIG. 1 shows in section separately shown modules of a pressure regulator of modular design having a wear sensor device and having exchangeable valve seat modules and regulating piston modules and also a pressure unit having couplable compressed-air modules, there being shown in each case two different modules which can be combined with one and the same basic housing of the pressure regulator.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

In the figures, 10 denotes as a whole a pressure regulator of modular design which is used for regulating the pressure in a medium-conducting line (not shown specifically). For example, the pressure regulator 10 is employed in a coating plant, in order to regulate the pressure in a coating line, via which paint is conveyed to an application device, such as for example a spray gun or a rotary atomiser.

The modular pressure regulator 10 comprises a basic housing 12 which can cooperate and be combined with exchangeable functional modules in the form of valve seat modules 14, regulating piston modules 16 and a pressure unit 18, which for its part can be constructed as a compressed-air cascade with couplable compressed-air modules 20. Of these, two each and in each case differently formed valve seat modules 14.1, 14.2, regulating piston modules 16.1, 16.2 and compressed-air modules 20.1, 20.2 are shown in FIG. 1. The pressure unit 18 also includes additionally a connecting element 22 which is formed as a connecting plate 24 in the present exemplary embodiment. This will be discussed further hereinbelow.

In FIGS. 2 to 7, in each case an assembled pressure regulator 10 having the component parts 12, 14.1, 16.1, 20.1 or 20.1 and 20.2, and 22 are shown. For the sake of clarity, in each case not all components are provided with reference symbols in these figures.

The basic housing 12 of the pressure regulator 10 is formed as a housing body 26 with a cylindrical outer lateral surface 28 and delimits a first module space 30 for one of the valve seat modules 14 and a second module space 32 for one of the regulating piston modules 16. The module spaces 30, 32 are arranged coaxially to one another and in the axial direction one behind the other and merge into one another, the first module space 30 having a smaller cross-section than the second module space 32. As a result, the transition between the two module spaces 30, 32 is formed as an encircling step surface 34 facing towards the second module space 32. The module spaces 30 and 32 are each accessible from outside from the opposite end sides 36 and 38 of the basic housing 12, so that valve seat modules 14 and regulating piston modules 16 can be inserted into and removed from the first module space 30 and the second module space 32, respectively.

The module spaces 30, 32 have a circular cross-section in the present exemplary embodiment, but may also have cross-sections differing therefrom.

The basic housing 12 comprises additionally an inlet duct 40, which extends between the outer lateral surface 28 and the first module space 30. An angled outlet duct 42 extends between the step surface 34 and the outer lateral surface 28 of the basic housing 12. At the outer lateral surface 28 of the basic housing 12, the inlet duct 40 and the outlet duct 42 can be connected by means of respective connections 40a and 42a to the medium-conducting line in which the pressure regulator 12 is to be arranged.

The valve seat modules 14 each have a hollow valve housing 44 with an outer contour which is complementary to the inner contour of the first module space 30 of the basic housing 12. The valve housing 44 delimits a flow duct 46 which extends between an inlet opening 48 and an outlet opening 50. The inlet opening 48 is formed, positioned and dimensioned such that it is connected medium-tightly to the inlet duct 40 of the basic housing 12 when the valve seat module 14 is inserted in the first module space 30 of the basic housing 12. The outlet opening 50 then opens towards the second module space 32 of the basic housing 12.

In the flow duct 46 there is arranged a valve seat 52 which can be closed or released by a closing element 54 which is mounted movably between a closed position and a released position, so that the through-flow of medium can be selectively blocked or released. The closing element 54 is prestressed into its closed position by a spring 56.

In the case of two valve seat modules 14.1 and 14.2 which are different from one another, for example the respective valve seats 52 and the respective flow ducts 46 have different diameters at least in the region downstream of the valve seats 52. The closing elements 54 may also have different forms which are adapted to the respective valve seat 52 present. This can be seen in FIG. 1 using the example of the two valve seat modules 14.1 and 14.2.

The regulating piston modules 16 each have a piston housing 58 with an outer contour which is complementary to the inner contour of the second module space 32 of the basic housing 12. The piston housing 58 delimits a piston space 62 open towards a flow side 60 of the piston housing 58.

In the piston space 62 there is displaceably mounted a regulating piston 64 which carries on its piston surface facing the flow side 60 a coaxial tappet 66. On its side facing away from the flow side 60, the regulating piston is carried by a piston rod 68 which extends through the piston housing 58 and, on a pressure side 70 opposite the flow side 60, out of the piston housing 58. At the free end there, the piston rod 68 carries a coupling stub 72 which, for its part, cooperates with a compressed-air module 20. This will be discussed further hereinbelow.

In operation, a regulating piston module 16 is inserted, with its flow side 60 and the tappet 66 in front, into the second module space 32 of the basic housing 12 and lies with the flow side 60 against the step 32 of the basic housing 12. When a valve seat module 12 is situated in the first module space 30 of the basic housing 12, the tappet 66 projects through the outlet opening 50 of the valve seat module 12 into the flow duct 46 of the latter and lies against its closing element 54, as can be seen from FIGS. 2 to 7.

The regulating piston 64 here delimits regionally a variable flow space 74 which extends between the flow duct 46 in the valve seat module 14 and the outlet duct 42 in the basic housing 12. When the regulating piston module 16 is inserted into the second module space 32 of the basic housing 12, the regulating piston 64 delimits this variable flow space 74 together with the piston space 62, the step surface 34 and the valve seat module 14. The volume of the variable flow space 74 depends, on the one hand, on the position of the regulating piston 64 and, on the other hand, on the dimensions of the piston space 62 and of the regulating piston 64.

In the case of two regulating piston modules 16.1 and 16.2 which are different from one another, in particular the respective piston spaces 62 and regulating pistons 64 and piston spaces 62 have different diameters. It may happen that these diameters are so small that the flow space 74 formed no longer leads fluidically directly to the outlet duct 42 in the basic housing 12; this is illustrated, for example, in the case of the regulating piston module 16.2 in FIG. 1. It can also be seen in this figure that in such a case a side channel 76 branches off from the piston space 62, so that a flow connection between the flow space 74 and the outlet duct 42 in the basic housing 12 is ensured when the corresponding regulating piston module 16 is situated in the second module space 32.

Overall, there exists a through-flow path 78 which extends between the connections 40a and 42a and in which the valve seat 52 is arranged. In the present exemplary embodiment, the through-flow path 78 is formed by the inlet duct 40 in the basic housing 12, by the flow duct 46 in the valve seat module 14, by the variable flow space 74 and by the outlet duct 42 in the basic housing 12. The through-flow path 78 can thus be freed or closed by the closing element 54.

The through-flow path 78 can be seen only in FIGS. 2, 3 and 5 to 7. In these figures and in FIG. 4, for the sake of clarity in each case not all of the components explained are provided with a reference symbol.

The activation of the regulating piston 62 and in this way the activation of the closing element 54 is effected via the pressure unit 18, which, when the pressure regulator 10 is operational, is mounted on the side of the basic housing 12 on which the regulating piston module 16 is situated.

A compressed-air module 20 comprises a compressed-air housing 80 with a working space 82 which is covered on one side by a pressure membrane 84 which can act on a coupling piston 86 guided in the working space 82.

The pressure module 20.1 shown in FIG. 1 is a coupling module 88, the working space 82 of which is open towards the side facing away from the pressure membrane 84, so that the piston rod 68 of the regulating piston module 16 can project on the pressure side of the latter into the working space 82 of the coupling module 88. The coupling stub 72 of the piston rod 68 engages in a coupling receptacle 90 in the coupling piston 86 in the assembled state of the components. This can be seen in FIGS. 2 to 7.

In the case of the pressure regulator 10 shown in FIG. 2, the pressure unit 18 comprises the coupling module 88 and the above-mentioned connecting plate 24. The latter has, for its part, a pressure space 92, to which compressed air can be supplied via a connection 94. The pressure space 92 of the connecting plate 24 overlaps the pressure membrane 84 of the coupling module 88 in the assembled state.

When the connection 94 is now supplied with compressed air, this air flows into the pressure space 92 via the pressure membrane 84 and curves the latter in the direction of the basic housing 12 of the pressure regulator 10. As a result, the coupling piston 86 is moved in the same direction, whereby the regulating piston 64 coupled thereto acts by its tappet 66 against the force of the spring 56 on the closing element 54 of the valve seat module 14 and the valve seat 52 is released. Between the closing element 54 and the valve seat 52 there then forms an encircling annular gap 96, as can be seen in FIGS. 3 and 6. The curvature of the pressure membrane 84 thus produces an axial movement of the closing element 54.

The pressure module 20.2, shown in FIG. 1, of the pressure unit 18 is an intensifying module 98. In the case of this module, components which correspond to those of the coupling module 88 are provided with the same reference symbols.

The working space 82 therein is not open on the side facing away from the pressure membrane 84 but is closed by a partition wall 100, by which, for its part, is guided a plunger piston 102 which is connected to the coupling piston 86 in the working space 82. The working space 82 is connected to the environment via a bore (not shown specifically) for pressure relief.

Also present in the compressed-air housing 80 of the intensifier module 98 is a connecting duct 104 which extends, axially parallel to the working space 82, through the compressed-air housing 80 and also through the pressure membrane 84.

In use, the intensifier module 98 is arranged between the coupling module 88 and the connecting plate 24 of the pressure unit 18; this is shown in FIG. 3. When there the connection 94 of the connecting plate 24 is supplied with compressed air, this air flows firstly into the pressure space 92 via the pressure membrane 84 of the intensifier module 98, where it acts on the pressure membrane 84 of the latter. This air presses the plunger piston 102 against the pressure membrane 84 of the coupling module 88, which again acts on the coupling piston 86 of the latter and the regulating piston 64 coupled thereto and the closing element 54 of the valve seat module 14, as explained above.

At the same time, however, compressed air also flows via the connecting duct 104 out of the pressure space 92 of the intensifier module 98 into the pressure space 92 of the coupling module 88. In this way, the pressure membrane 84 of the coupling module 88 is subjected to a force, on the one hand, mechanically by the plunger piston 102 of the intensifier module 98 and, on the other hand, pneumatically by the compressed air present. Since the compressed air now acts on two pressure membranes 84, the active area for the compressed air which can be utilised in order to transmit a force to the regulating piston 64 is approximately twice as great as in the case in which only the coupling module 88 is used.

This pressure cascade can be enlarged if the pressure unit 18 is composed not only of the coupling module 88 and a single intensifier module 98, but of the coupling module 88 and two or more intensifier modules 98.

The individual components of the pressure unit 18 are coupled to one another by connecting screws 106 which are adapted in their length to the the respective dimension of the resulting pressure unit 18, and are marked only in FIGS. 1 to 3.

Figure 4:
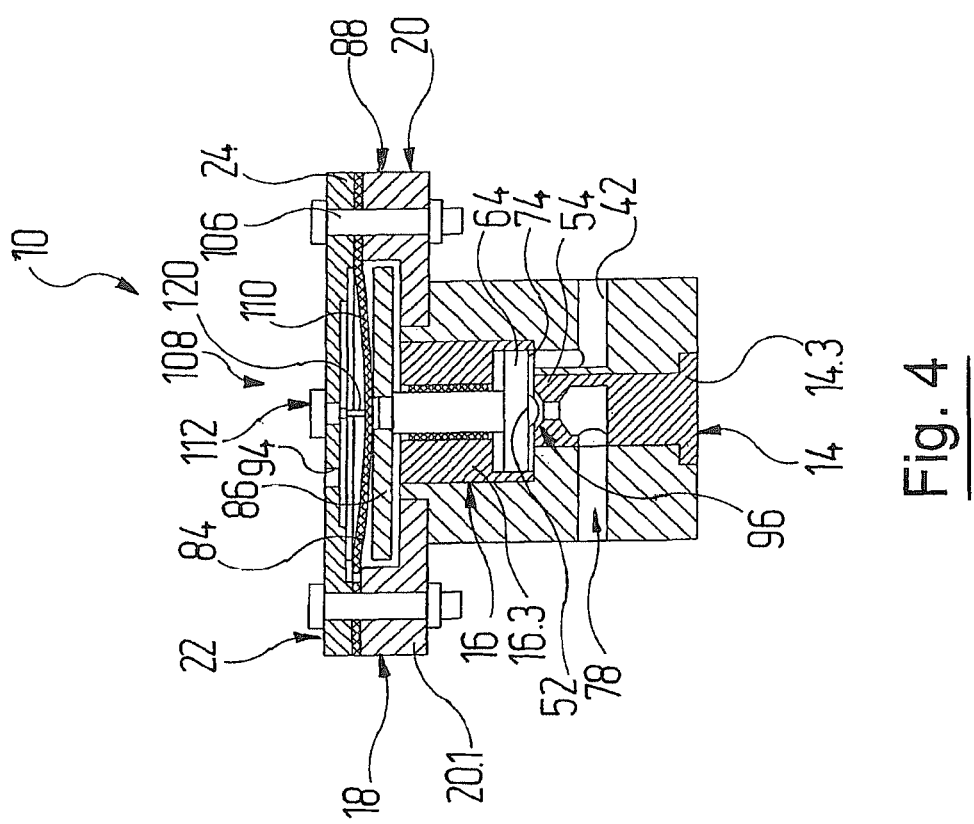
FIG. 4 shows a section of a pressure regulator with further-modified regulating piston module and valve seat module, so that the pressure regulator can operate as a backpressure regulator.

In FIG. 4 there is shown a modification in which the pressure regulator 10 operates as a backpressure regulator, through which medium flows in the other direction to that in the case of the pressure regulator 10 according to FIGS. 1 to 3 and 5 to 7. In this modification, a further-modified valve seat module 14.3 and a further-modified regulating piston module 16.3 are brought to bear. The closing element 54 in this modification is not arranged in the valve housing 44 of the valve seat module 14.3, but is carried by the regulating piston 64 of the regulating piston module 16.3 instead of the tappet 66. The valve seat 52 is arranged, accordingly, facing the closing element 54 in the flow duct 46 of the valve seat module 14.3. When the connection 94 of the pressure unit 18 at sufficient pressure is supplied with compressed air, the closing element 54 closes, accordingly, against the valve seat 52. If the pressure at the connection 94 is less than the pressure owing to the medium flowing into the variable flow space 74, the regulating piston 64 is pushed away from the valve seat 52 and releases the latter.

The pressure regulator 10 comprises additionally a wear sensor device 108, with which a wear on the closing element 54 and/or the valve seat 52 of the pressure regulator 10 can be monitored during operation.

The wear sensor device 108 is configured in such a way that with it the position of the closing element 54 relative to a reference zero position can be sensed. The sensing of the position of the closing element 54 here can be effected indirectly or directly.

The reference zero position of a closing element 54 exists by definition when an unimpaired closing element 54 occupies its closed position and lies against and closes an unimpaired valve seat 52.

In the exemplary embodiment shown in the present case, the measurement of the position of the closing element 54 is effected indirectly by sensing the configuration of at least one pressure membrane 84 in the pressure unit 18 which serves as a measuring membrane 110. The configuration of the measuring membrane 110 here reflects the position of the closing element 54.

In pressure unit 18 described in the present case, the pressure membrane 84 of the compressed-air module 20 adjacent to the connecting plate 24 is always utilised as the measuring membrane 110. If one or more intensifying modules 98 are present, this is then the pressure membrane 84 of the correspondingly arranged intensifying module 98, otherwise the pressure membrane 84 of the coupling module 88 serves as the measuring membrane 110.

The connecting plate 24 carries a distance sensor 112 which can sense the distance between a measuring point 114 on the measuring membrane 110 and a reference point 116, for example a surface of the distance sensor 112 itself. The measured distance reflects, for its part, the curvature of the measuring membrane 110.

Here, the distance between the measuring point 114 and the reference point 116 is measured in a direction parallel to the movement direction of the closing element 54. In practice, the measurement is carried out coaxially thereto.

The measured curvature can be compared with a reference curvature which the measuring membrane 110 has when the closing element 54 occupies its reference zero position. This situation can be seen in FIGS. 2 and 5; in the present exemplary embodiment, the pressure membrane 84 is in this case always flat and the distance then measured by the distance sensor 112 defines the reference value for the reference curvature of the measuring membrane 110 and for the reference zero position of the closing element 54.

When the through-flow path 78 in the pressure regulator 10 is to be freed and the connection 94 is supplied with compressed air, the pressure membrane 84 curves and the distance of the measuring point 114 to the reference point 116 increases. The change of the distance represents the movement of the closing element 54 away from the sealing seat 52. This is shown in FIGS. 3 and 6. Via the distance thus determined, it is also possible to sense and monitor the passage cross-section of the annular gap 96 explained above.

The pressure membrane 84 serving as the measuring membrane 110 is generally speaking an actuator which is coupled to the closing element 54, with wear sensor device 108 determining the position of the closing element 54 indirectly via the configuration and/or position of this actuator. Instead of the measuring membrane 110, for example also the regulating piston 64 could serve as such an actuator.

Instead of the pressure membrane 84, for example also a piston displaceable under pressure may serve as actuator, the movement of which is transmitted to the closing element 54. For example, the coupling piston 86 may form the actuator and for this purpose seal it off from the surrounding compressed-air housing 80, the coupling receptacle 90 for the coupling stub 72 of the piston rod 68 in this case being formed as a blind bore. The pressure membrane 84 can then be dispensed with. The measuring point 114 is in this case on the sealing coupling piston 86 and the wear sensor device 108 senses the distance between the coupling piston 86 and the reference point 116. The statements above regarding the coupling of a plurality of compressed-air modules 20, as shown in FIG. 3, apply mutatis mutandis to compressed-air modules modified in this way.

FIG. 7 now illustrates a wear both of the closing element 54 and of the valve seat 52. The head of the closing element 54 is for this purpose shown smaller than in FIGS. 5 and 6 and the valve seat 52 no longer has a sharp encircling edge as in FIGS. 5 and 6, but is worn to a curved surface. As a result, the closing element 54 in its closed position projects further into the valve seat 52 than is the case of the unworn configuration. This is also the case when only the closing element 54 or only the valve seat 52 show signs of wear.

As a result, also the regulating piston 64 is pushed back further into the pressure unit 18 and the pressure membrane 84, i.e. the measuring membrane 110, is pressed further in the direction of the connecting plate 24. Then, in the closed position of the closing element 54, the distance of the measuring point 114 of the measuring membrane 110 from the reference point 114 on the distance sensor 112 is thus smaller than in the case of the reference curvature of the measuring membrane 110.

In the case of the pressure regulator 10 operating as a backpressure regulator according to FIG. 4, the circumstances are reversed: In the event of a wear of the closing element 54 there and/or of the valve seat 52 there, the distance of the measuring point 114 of the measuring membrane 110 from the reference point 114 on the distance sensor 112 is greater than in the case of the reference curvature of the measuring membrane 110.

If now it is sensed during operation that the reference curvature and the measured curvature of the measuring membrane 110 deviate from one another when the closing element 54 occupies its closed position, this indicates a wear, which can be indicated to an operator for example via an acoustic and/or optical signal. It is possible here to preset a threshold value which defines a tolerable deviation of the curvature of the measuring membrane 110 from the reference curvature and thus also a tolerable deviation of the position of the closing element 54 from its reference zero position, so that an indication occurs only if this threshold value is exceeded.

In the case of the present exemplary embodiment, the distance sensor 112 is formed as a tactile pressure sensor 118. The pressure sensor 118 for this purpose comprises a measuring tappet 120 which can press against the measuring membrane 110.

The pressure sensor 118 may also be present as a piezo-electric pressure sensor known per se or else in the form of other pressure sensors customary in the market, in particular capacitive or inductive sensors come into consideration for this purpose. The distance sensor 112 may also be formed as a contactlessly operating distance sensor. For this purpose, for example an ultrasonic sensor or an optical sensor may be used, as are known per se.

In the pressure space between the measuring membrane 110 and the connecting plate 24, no material is present apart from compressed air, so that the measurement can be effected largely interference- and barrier-free.

In the case of a modification (not shown specifically), the position of the closing element 54 can also be directly sensed and monitored. For this purpose, for example a distance sensor 112 may be installed on the respectively used valve seat module 14, which senses the distance to the closing element 54.

The above explanations regarding the evaluation of the curvature of the measuring membrane 110 or the position of the closing element 54 apply to this mutatis mutandis.

In this case, however, on a change of the valve seat module 14, the distance sensor 112 must also be exchanged as well. In addition, in the case of the individual valve seat modules 14, it should then be ensured that, also with different closing elements 54, the distance to the distance sensor 112 without wear is always of the same size. Otherwise, on each change, a calibration of the system to the respective zero position must be performed.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A pressure regulator for fluid media comprising:
a modular design and a basic housing with at least one module space for housing a functional module;
a through-flow path which extends between two connections for a media-conducting line and through the at least one module space;
a valve seat module having a valve seat and a closing element mounted movably between a closed position and a released position, the valve seat module being arranged in the through-flow path and capable of being released or closed by the closing element,
wherein
a wear sensor device, with which a wear on the closing element and/or the valve seat can be monitored during operation.

2. The pressure regulator according to claim 1, wherein the wear sensor device is configured in such a manner that a position of the closing element relative to a reference zero position can be sensed.

3. The pressure regulator according to claim 2, wherein the reference zero position is defined when the unimpaired closing element occupies its closed position and lies against and closes an unimpaired valve seat.

4. The pressure regulator according to claim 2, wherein the position of the closing element can be indirectly sensed by the wear sensor device.

5. The pressure regulator according to claim 4, wherein the closing element is coupled to an actuator and the wear sensor device is configured in such a manner that the wear sensor device determines the position of the closing element indirectly via a configuration and/or position of the actuator.

6. The pressure regulator according to claim 5, wherein
a) the actuator is a pressure membrane which curves as a result of pressure, with an axial movement of the closing element being producible by the pressure membrane;
b) the wear sensor device comprises a distance sensor, by which the distance between a measuring point on the pressure membrane and a reference point can be sensed, so that the pressure membrane serves as a measuring membrane.

7. The pressure regulator according to claim 6, wherein the distance between the measuring point and the reference point is measurable in a direction parallel to the movement direction of the closing element, in particular coaxially thereto.

8. The pressure regulator according to claim 6, wherein the pressure regulator is of modular design and comprises a basic housing with at least one module space for functional modules.

9. The pressure regulator according to claim 8, wherein the pressure regulator comprises a pressure unit comprising a plurality of compressed-air modules which each comprise a compressed-air membrane which curves as a result of pressure, with an axial movement of the closing element being producible by the pressure membranes.

10. The pressure regulator according to claim 9 wherein the pressure unit comprises at least one compressed-air module and the pressure membrane of the latter is the measuring membrane.

11. The pressure regulator according to claim 1, wherein the valve seat module includes a valve seat housing with the valve seat and the closing element both being housed within the valve seat housing.

12. The pressure regulator according to claim 1, wherein the pressure regulator comprises at least one exchangeable valve seat module which is insertable into a module space of the basic housing and has a flow duct, in which the valve seat is arranged and which forms a section of the through-flow path when the valve seat module is inserted into the module space.

13. The pressure regulator according to claim 12, wherein the at least one valve seat module comprises the closing element.

14. The pressure regulator according to claim 1, wherein the pressure regulator comprises at least one exchangeable regulating piston module which is insertable into a module space of the basic housing and has a regulating piston which regionally delimits a variable flow space which forms a section of the through-flow path when the regulating piston module is inserted into the module space.

15. The pressure regulator according to claim 1, wherein the pressure regulator comprises a pressure unit comprising a plurality of compressed-air modules which each comprise a compressed-air membrane which curves as a result of pressure, with an axial movement of the closing element being producible by the pressure membranes.

16. The pressure regulator according to claim 1, wherein the basic housing has at least two module spaces for functional modules.

17. The pressure regulator according to claim 16, wherein a first module space of the at least two module spaces merges with a second module space of the at least two module spaces.

18. The pressure regulator according to claim 17, wherein the first module space has a smaller cross-section than the second module space.

19. The pressure regulator according to claim 18, further comprising a transition between the first module space and the second module space, the transition being an encircling step facing the second module space.

20. The pressure regulator according to claim 16, wherein a first module space of the at least two module spaces is arranged coaxially with a second module space of the at least two module spaces.

* * * * *